United States Patent [19]
Simon

[11] Patent Number: 5,819,689
[45] Date of Patent: Oct. 13, 1998

[54] BIRD TOWER

[76] Inventor: David F. Simon, 47730 Romeo Plank Rd., Macomb Twp., Mich. 48044

[21] Appl. No.: 747,015

[22] Filed: Nov. 7, 1996

[51] Int. Cl.$^6$ .................................................. A01K 31/12
[52] U.S. Cl. ........................................ 119/537; 119/57.8
[58] Field of Search ................................ 119/537, 57.8, 119/57.9, 52.2, 52.3

[56] References Cited

U.S. PATENT DOCUMENTS

| | | | |
|---|---|---|---|
| D. 175,292 | 8/1955 | Austgen | 119/537 |
| 4,104,987 | 8/1978 | Winston | 119/57.8 |
| 4,261,294 | 4/1981 | Bescherer | 119/57.8 |
| 4,318,364 | 3/1982 | Bescherer | 119/57.8 |
| 4,497,278 | 2/1985 | Balder et al. | 119/537 |
| 4,627,384 | 12/1986 | Courteau | 119/537 |
| 5,218,927 | 6/1993 | Addams | 119/537 |
| 5,381,758 | 1/1995 | Simon | 119/537 |
| 5,406,908 | 4/1995 | Burleigh | 119/57.8 |
| 5,410,986 | 5/1995 | Washam | 119/57.8 |
| 5,511,512 | 4/1996 | Pintavilli et al. | 119/537 |
| 5,533,467 | 7/1996 | Lancia | 119/57.9 |

*Primary Examiner*—Paul J. Hirsch
*Attorney, Agent, or Firm*—Arnold S. Weintraub

[57] ABSTRACT

An improved avian tower comprises a base to which is attached a substantially cylindrical center column which surrounds a central post, formed from a plurality of interdigitating column portions wherein each column portion includes a body, a first shoulder and a second shoulder whereby the first shoulder and second shoulder of adjoining column portions cooperate to allow configurable construction of the center column. A plurality of perches are attached to at least one of the plurality of column portions.

9 Claims, 3 Drawing Sheets

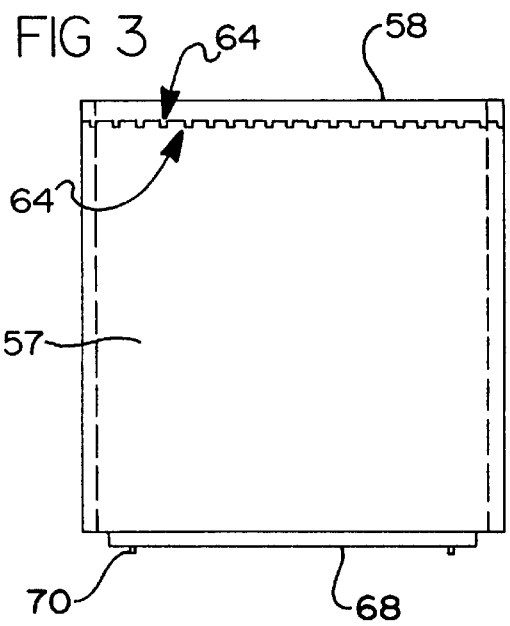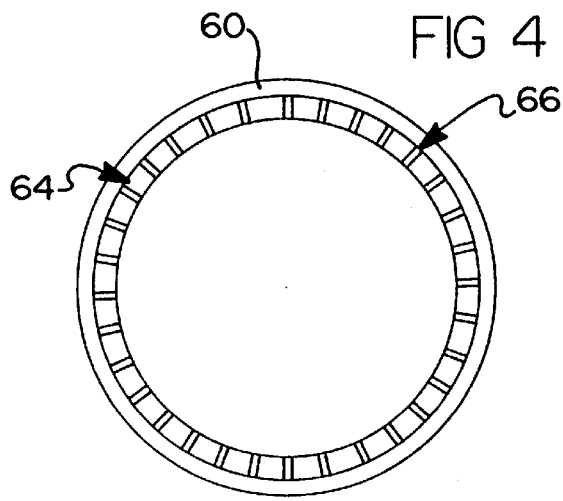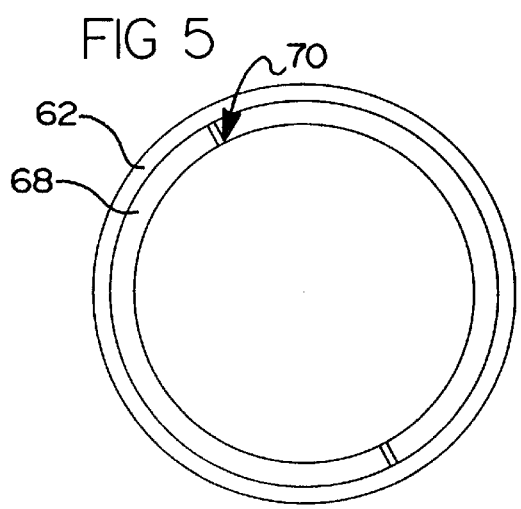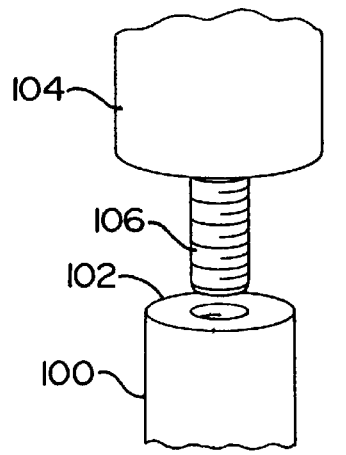

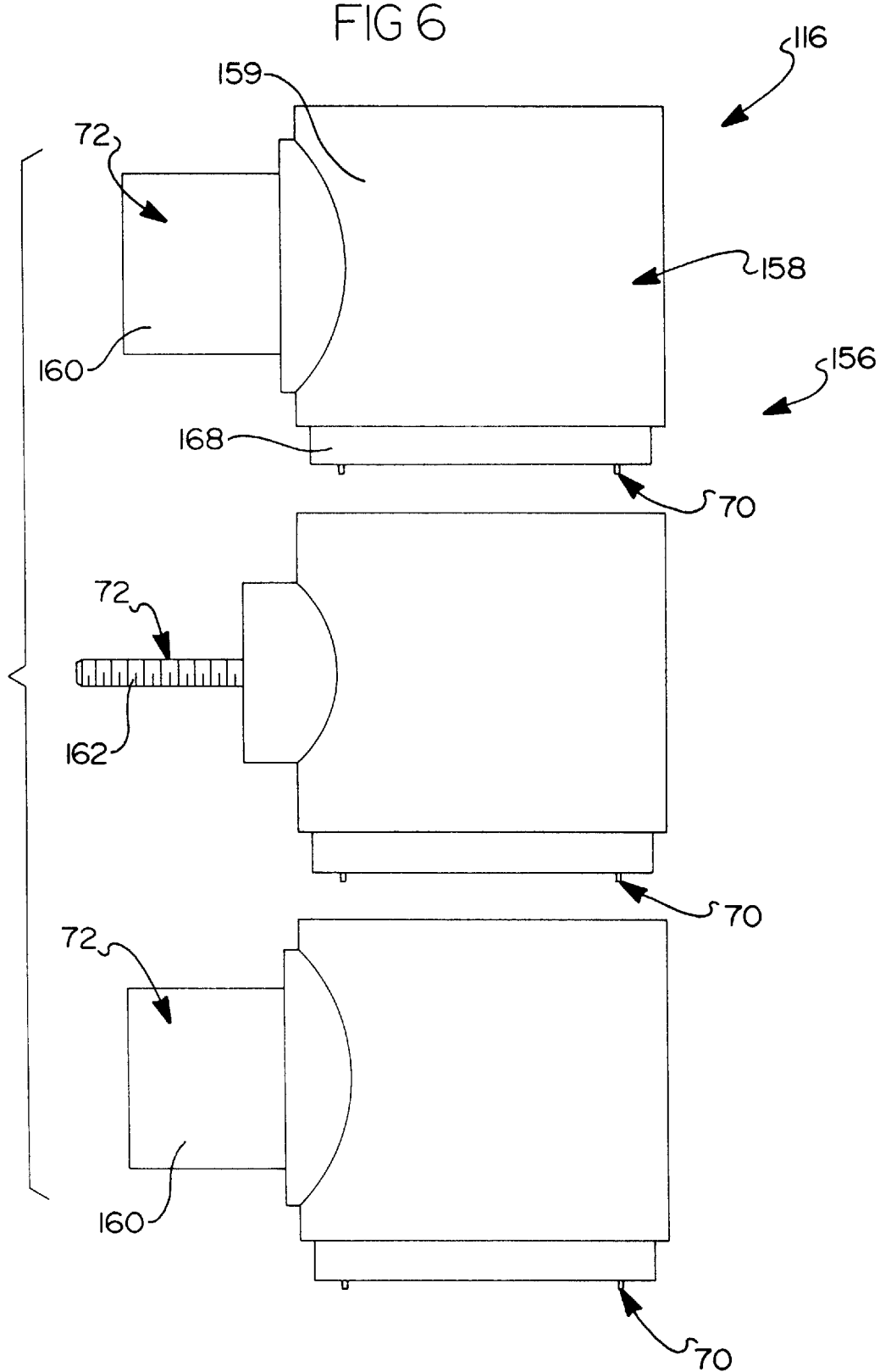

BIRD TOWER

BACKGROUND OF THE INVENTION

1. Field of the Invention

The present invention generally relates to avian perches. More particularly, the present invention concerns a tower structure suitable for birds of various sizes including larger birds such as macaws. Even more particularly, the present invention relates to a highly configurable and expandable bird tower.

2. Description of Related Art

Bird cages and other indoor environments for avians are well known. Particularly, all are familiar with the common bird cage which contains a finch, parakeet, canary, or some other small bird along with a water dish and a food bowl. Such cages are adequate for small birds. However, in order to comfortably accommodate a larger bird, a cage has to be extremely large and cumbersome.

Further, these cages are normally made of steel or other metals. These surfaces can, under certain circumstances, induce illness in the birds living therein and therearound. Additionally, cleaning a perch that is seated inside a cage can be a time consuming task.

Bird stands have been developed to overcome some of these disadvantages. For example, U.S. Pat. No. 5,381,758 on a PARROT TOWER issued to Simon on Jan. 17, 1995 and is incorporated herein by reference, teaches a parrot tower which includes a tray, a center column releasably mounted to the tray, and a plurality of perches connected to the center column. It must be appreciated that although the Parrot Tower of Simon represents a substantial advance in the art, the tower must be configured at the point of manufacture. More particularly, the height of the center column may not be substantially altered by the user. Additionally, the perches connected to the center column are not substantially configurable as they must seat in a supplied aperture. Thus, the tower is difficult to transport, and may be generally used only by specific breeds of bird.

What is needed in the art is a parrot tower that is configurable such that an end user may adjust the height of the tower and the spacing of the perches extending therefrom depending upon the type of bird that is to utilize the tower and the environment within which the tower and the bird are to be maintained. It is to the solution of this problem to which the present invention is directed.

SUMMARY OF THE INVENTION

The present invention is an avian or bird or parrot tower formed of washable and sterilizable plastic. The parrot tower of the present invention comprises:

(a) a base;

(b) a central post disposed on the base and extending upwardly therefrom;

(c) a substantially cylindrical center column circumferentially disposed about the post and comprising a plurality of column portions, each of the plurality of column portions comprising:

(i) a substantially hollow cylindrical body having an internal diameter greater than the diameter of the post, and having a first edge and an opposed second edge;

(ii) an annular first shoulder recessed from the first edge and extending into the hollow interior of the body, the first shoulder having an internal diameter greater than the diameter of the post;

(iii) a second annular shoulder recessed from the second edge and extending into the hollow interior and downwardly extending from the body at the second edge, thereof the second shoulder having an external diameter less than the internal diameter of the body and an internal diameter greater than the diameter of the post, the second shoulder insertable into the hollow interior of the body of an adjacent portion, the second shoulder abutting against the first shoulder of the adjacent portion;

(d) a plurality of perches releasably connected to the center column; and (e) a topmost portion surmounting the post and secured thereto.

The parrot tower of the present invention generally includes a tray upon which is disposed a center column. Each column portion or collar abuts against at least one other column portion. The bottommost column portion may seat in an aperture or recess formed in the tray such that the center column is securely housed in the tray, when mounted about the post. Each of the column portions may have a different configuration depending upon the accessory that is to be attached thereto.

The topmost column, preferably, is threadedly connected to the post, and, thus, compresses the other column portions together to form a tight and secure center column.

For a more complete understanding of the present invention, reference is made to the following detailed description and accompanying drawings. In the drawings, like reference numerals refer to like parts throughout the several views, and where:

BRIEF DESCRIPTION OF THE DRAWINGS

FIG. 3 is a cross-sectional view of the column portion of FIG. 2 taken along line 3—3;

FIG. 4 is a top plan view of the column portion of FIG. 2;

FIG. 5 is a bottom plan view of the column portion of FIG. 2;

FIG. 6 is an exploded view of a center column in accordance with the present invention; and FIG. 7 is a fragmentary view of a topmost column portion and center post.

DETAILED DESCRIPTION OF THE PREFERRED EMBODIMENTS

Figure 1:
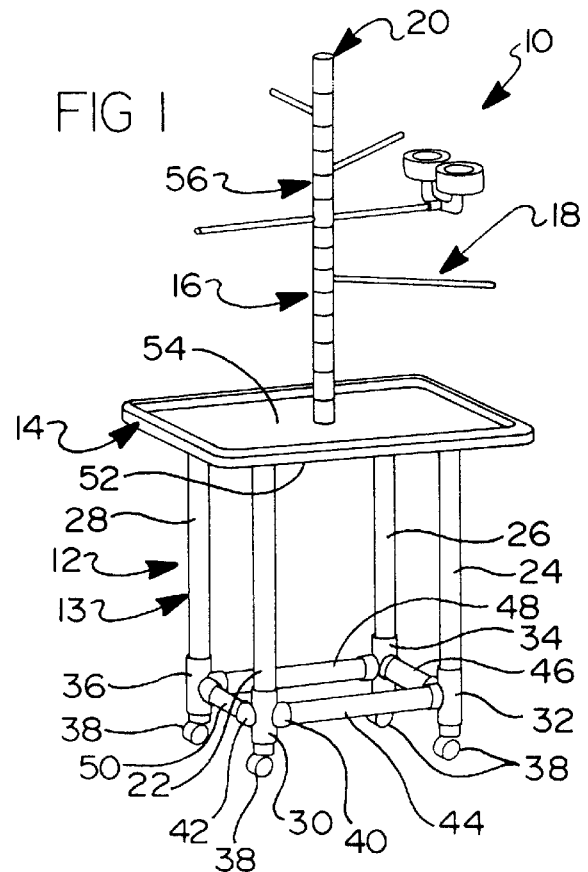
FIG. 1 is a perspective view of a bird tower in accordance with the present invention.
Figure 2:
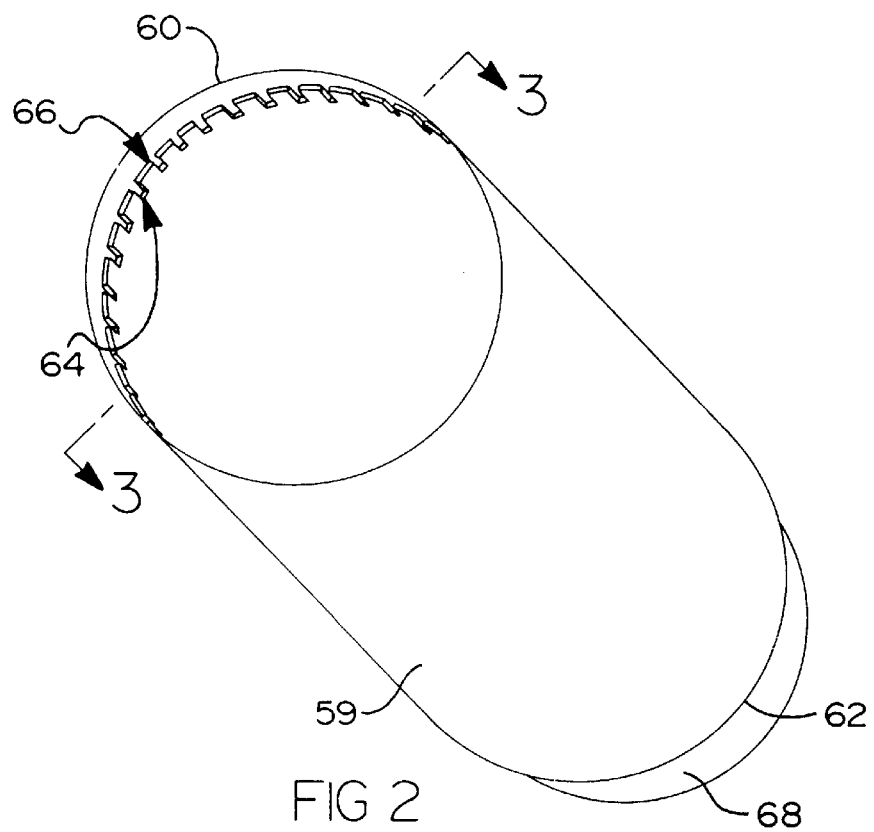
FIG. 2 is a perspective view of a column portion in accordance with the present invention.

Referring now to FIG. 1 there is shown a bird tower in accordance with the present invention, and generally shown at 10. The bird tower 10 comprises a base 12, a center column 16, a plurality of perches 18, and a cap 20.

The base 12 preferably includes a stand 13 and a tray 14. The stand 13, in the preferred embodiment, comprises four legs 22, 24, 26, 28. Each leg 22, 24, 26, 28 is releasably attached to a joint 30, 32, 34, 36. Each of the joints 30, 32, 34, 36 has a pair of substantially horizontally aligned legs 40, 42 set at right angles to each other. An identical wheel or roller 38 is attached at the bottom of each joint 30, 32, 34, 36. Each wheel 38 is preferably configured identically to ease production; however, differently configured wheels may be used, although not preferably. The plurality of wheels allows the tower 10 to be easily transported over a surface such as a floor or the like.

Reinforcing members 44, 46, 48, 50 extend between and are removably mounted to each of the plurality of legs 30, 32, 34, 36. The reinforcing members 44, 46, 48, 50 increase the stability of the stand 13. Additionally, the members 44, 46, 48, 50 provide additionally stability when the tower 10 is moved about.

The tray 14 is mounted atop each of the legs 22, 24, 26, 28. The tray 14 may be mounted atop each leg via removable means for mounting such as screws, clasps, hooks or the like. Alternatively, the tray 14 may have a plurality of recesses formed at the bottom surface 52 thereof. As such, each leg 22, 24, 26, 28 may snugly seat in one of the four recesses. The tray 14 does have a centrally located downwardly directed recess 54 into which the center column 16 may be snugly seated. This will be discussed in further detail hereinbelow.

The tray 14 is provided to catch any food particles spilled by the bird as it eats. Additionally, the tray 14 serves to catch any waste materials excreted by the bird while perched on the tower 10. To this end, the tray 14 is configured to extend beyond the ends of each perch attached to the center column 16 which will be described in greater detail hereinbelow.

Although the preferred embodiment of the base 12 has been described hereinabove, the base may comprise only the tray 14. However, as such, the tower 10 will not be as easily transported.

The center column 16 is substantially cylindrical and is formed from a plurality of column portions or collars 56. For the purposes of discussion, reference will be made to one column portion 58 as an exemplar. It is to be appreciated that the center column 16 is comprised of a plurality of column portions 56 such as column collar or portion 58.

As depicted in FIGS. 2–6, in a first embodiment hereof, the column portion 58 has a body 59 that is substantially cylindrical and hollow in its configuration having (a) diameter d greater than that of the post, (b) a top or first edge 60, (c) a second or bottom edge 62, (d) an annular first shoulder 64 interiorly disposed the body 59 and recessed from the first edge 60, (e) the first shoulder 64 having a plurality of notches 66 formed therein.

The column portion 58 additionally includes a second annular shoulder 68 downwardly extending from the second edge 62. The second shoulder 68 has an outer diameter that is slightly less than the inner diameter of the body 59 to allow the second shoulder 68 to be slidably received within the body 59. Additionally, the second shoulder 68 has at least one detent 70 extending therefrom.

As such, and in use, the at least one detent 70 extending from the second shoulder 68 seats in one of the plurality of notches 66 in the first shoulder 64 of an adjoining one of the plurality of column portions 56. In this fashion, the center column 16 may be configured in a variety of fashions as will be described in detail hereinbelow.

Preferably, each of the plurality of column portions 56 engages another one of the plurality of column portions 56 in removably mountable fashion. Because there are provided a plurality of notches 66, for example, about eleven notches for every 90° of arc of the shoulder, the adjoining column portions may be rotated relative to one another and then pressed together such that a detent 70 sets in one of the plurality of notches 66 in the adjoining column portion. This maintains the relative position of each of the adjoining column portions.

While some column portions will only comprise the elements set out hereinabove, others will include means 72 for attaching perches, mirrors, or other avian accessories.

Furthermore, it is possible to eliminate the notch and detent assembly and simply interdigitate the collars by inserting a shoulder 68 into the interior of the adjacent collar portion such that the edge 62 abuts against the adjacent collar shoulder 64. In this way, the cooperative notches and detents are eliminated.

Referring now to FIG. 6, there is depicted therein, in exploded fashion, a center column 116. As can be seen, the center column 116 comprises of a plurality of column portions 156. Each of the plurality of body portions 156 has each of the elements described hereinabove with relation to the exemplar column portion 58. Additionally, each has a means 72 for attaching an avian accessory.

More particularly, the means 72 for attaching may be an annular shoulder 160 extending normal to the body 159. A perch, such as that disclosed in the Simon patent incorporated herein by reference, may slidably seat over the shoulder and then be mounted thereto via screws, sonic welding or the like.

Alternatively, a screw 162 may serve as the means for mounting 72. A perch or the like may be screwed onto the screw 162 such that it is removably attached to the center column 116. In this fashion, a plurality of perches may be attached to different column portions, and each of the column portions rotated relative to each other so that no two perches lie too close to one another. Additionally, this allows a user to change the configuration of the tower 10 in general, thus amusing a bird that is to be seated thereupon. By changing the configuration of the tower 10 upon occasion, the interest of the bird may be maintained which can result in better health and longevity of the bird.

As shown in FIG. 7, in assembling the center or central column there is provided an upstanding post 100 having a first end (not shown) secured to the tray 14 by any suitable means and an opposite, second end 102. The post has a height substantially equal to that of the column. Each collar or portion 56 has a diameter greater than the post and is circumferentially disposed therearound. Thus, the portions 56 are stacked atop each other about the post.

The post may comprise a plurality of threadably interconnected segments to enable alteration of the height of the post.

In utilizing the central post, the top or uppermost collar 104 or portion surmounts the top of the post. The uppermost collar is, then, threadably connected to the post via a threaded stud 106. By so-fastening the top collar, it creates a compressive force on the other portions to hold them fast. The force is sufficient to eliminate the need for the notch and detent assembly. Thus, the positioning of the accessories is achieved by relative positioning of the associated collars.

As is evident from the foregoing detailed description of the preferred embodiments of the present invention, the tower 10 presents advantages over the devices utilized in the past. The tower 10 is easier to use and provides the configurability that has not heretofore been available.

As will be realized, the invention is capable of other and different embodiments and its several details are capable of modifications in various obvious respects, all without departing from the invention.

Having, thus, described the present invention, what is claimed is:

1. An avian tower comprising:
 (a) abase;
 (b) a central post secured to the base and extending upwardly therefrom;

(c) a substantially cylindrical center column circumferentially disposed about the post and comprising a plurality of column portions, each of the plurality of column portions comprising:
  (i) a substantially hollow cylindrical body having an internal diameter greater than the diameter of the post, and having a first edge and an opposed second edge;
  (ii) an annular first shoulder recessed from the first edge and extending into the hollow interior of the body, the first shoulder having an internal diameter greater than the diameter of the post;
  (iii) a second annular shoulder recessed from the second edge and extending into the hollow interior and downwardly extending from the body at the second edge thereof, the second shoulder having an external diameter less than the internal diameter of the body and an internal diameter greater than the diameter of the post, the second shoulder insertable into the hollow interior of the body of an adjacent portion, the second shoulder abutting against the first shoulder of the adjacent portions;
(d) a plurality of perches releasably connected to the center column; and
(e) a topmost portion surmounting the post and secured thereto.

2. The avian tower of claim 1 wherein the internal diameter of the first and second shoulders are substantially equal.

3. The avian tower of claim 1 wherein at least one of the plurality of column portions includes means for attaching an avian accessory thereto.

4. The avian tower of claim 3 wherein the means for attaching an avian accessory comprises an annular shoulder extending from the body of at least one of the plurality of column portions.

5. The avian tower of claim 4 wherein the annular shoulder extending from the body of at least one of the plurality of column portions extends normal to the body to which it is attached.

6. The avian tower of claim 3 wherein the means for attaching comprises a screw extending from at least one of the plurality of column portions.

7. The avian tower of claim 1 wherein:
the post comprises a plurality of segments threadably interconnected for varying the height of the tower.

8. The avian tower of claim 2 further comprising:
  (a) the first shoulder of each of the plurality of collar portions having at least one notch formed therethrough,
  (b) the second shoulder of each of the plurality of collar portions having at least one detent formed integrally therewith and projecting therefrom, and
wherein the at least one detent of the second shoulder of each collar portion removably interengages with the at least one notch of the first shoulder of an adjacent column portion, thereby preventing rotation of the adjacent collar portions relative to each other after interengagement.

9. The avian tower of claim 8 further comprising:
the first shoulder having a plurality of notches disposed therearound, and
wherein the at least one detent of the second shoulder interengages with any one of the plurality of notches of the first shoulder, thereby enabling interengagement of the adjacent collar portions in a plurality of orientations relative to each other.

* * * * *